Dec. 18, 1962  A. H. WILLIAMS ETAL  3,068,552

METHOD OF MAKING A BEARING

Filed March 21, 1960

United States Patent Office 3,068,552
Patented Dec. 18, 1962

3,068,552
METHOD OF MAKING A BEARING
Arthur H. Williams, Riverside, and Karl E. Fenrich, Napierville, Ill., assignors to Chain Belt Company, Milwaukee, Wis., a corporation of Wisconsin
Filed Mar. 21, 1960, Ser. No. 16,242
5 Claims. (Cl. 29—149.5)

This invention relates to bearings having linings of a low-friction fibrous material and particularly to the method of forming the bearing to provide the maximum load-carrying ability.

The best present-day low-friction materials are fabrics of woven threads of certain resin fibers. However, the first heavy load applied to bearings utilizing such fabrics compacts the fibers and threads so that the bearings are loose thereafter, do not provide satisfactory operation, and wear at a faster rate.

The present invention provides the compaction of the fabric or other fibrous material lining in the course of manufacture of the bearing and provides an improved method of making a bearing having a minimum wear-rate and maximum load-carrying ability. The permanent compaction of some material which is effected may be a volumetric reduction of as much as 20%, particularly if the material includes a large percentage of voids which are filled in the compaction operation.

The invention includes the manufacture of sleeve-type friction bearings as well as ball and socket types such as for rod-ends which are used in applications involving high static and dynamic loads.

The ball and socket type, for example, comprises a hardened, inner ball, an outer ductile socket and a liner of the low-friction type material referred to. According to the invention, the liner is applied to the inside of a ductile sleeve with a thermo-setting resin or other bonding agent disposed therebetween. The exposed side of the liner may be coated with a heat-resistant silicone lubricant or the like, if desired and to serve as a bond inhibitor. The sleeve is then shaped by compression in suitable dies to form a socket around the ball with a substantially uniform span therebetween and so that the bonding agent forms and holds the fabric against the surface of the ball. The entire assembly is then heated to the temperature and for the period required to cure and set the bonding agent which first softens and expands into the interstices of the fabric and then hardens to provide a firm base for the fabric. The outside and ends of the socket are then machined to provide the same with the desired outer dimensions and inner and outer lips, as required. The assembly is then pushed through a sizing die to contract the socket and compact or "preset" the fibers as will be described. After the material has been compacted, the socket is radially enlarged slightly to relieve the binding which results from the reduction in size of the socket. The bearing is then ready for assembly in a housing or in the rod end for which this type of bearing is particularly adapted. The outer lip is formed to secure the bearing assembly in the rod end and the inner lip serves to restrain movement of the material from between the bearing parts under extremely high loads.

The object of the present invention is to provide an improved method of the manufacture of a low-friction material-lined bearing.

Another more particular object is to reduce the initial yielding and wear of the bearing lining when under load.

Another object of the invention is to provide an improved liner which may be arranged and secured within the bearing without the application of pressure and so that the liner and its base conform throughout with the respective dimensions of the inner and outer bearing members.

Another object is to provide a bearing which can be subjected to high static and dynamic loads without producing further appreciable permanent compression or deformation of the lining.

Other objects and advantages of the invention will appear in the following description of the same as illustrated in the accompanying drawings.

The method of the invention as applied to the manufacture of a ball and socket-type bearing is shown in FIGURES 1–8 of the drawings and includes initially placing liner 1 inside the cylindrical ductile sleeve 2 which is to form, the socket. The hardened ball 3 is generally truncated and provided with the bore 4 extending therethrough for receiving a mounting bolt, not shown.

Liner 1 may be formed of any of the suitable materials referred to, and if the liner is comprised of a fabric, the fabric may be woven as a tube or may be a curled strip of flat material. The liner is secured in sleeve 2 by the bonding agent to be employed, or by other means such as the press-fit of the liner in the sleeve. If the liner 1 is a fabric woven of the wear-resistant material and another material which is readily bonded by a suitable agent to the inner surface of sleeve 2, the wear-resistant material should extend longitudinally of sleeve 2 and the weave should be such that the wear-resistant material is predominant on the inside surface of the liner and so that the bondable material is predominant on the outside surface contacting sleeve 2. Preferably, the warp and the woof should both be formed of a wear-resistant material that is also capable of bonding.

Figure 1:
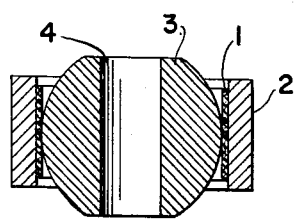
FIGURE 1 is a cross-section of the parts of a ball and socket-type bearing with the liner in assembled relation and prior to the forming operations.

Liner 1 is cut to a length a predetermined amount shorter than sleeve 2 and is bonded or secured to the inside of sleeve 2 as shown in FIG. 1. After the bonding agent has dried sufficiently sleeve 2 is placed over the ball 3 which should fit easily within the liner without disturbing the same.

The lubricant to serve as a bond-inhibitor may be applied to the liner or the ball and the assembly is then placed in between the forming dies 5 and 6. The internal clamping members 7 and 8 engaging the truncated ends of ball 3 and the pin 9 of member 8 extending into bore 4 of the ball, serve to secure the latter with respect to the dies. Means, not shown, may be employed to locate the sleeve axially with respect to the bore 4 of the ball, but is generally not required.

Dies 5 and 6 have concave working faces which engage the outer end corners of sleeve 2 and are disposed to move together to compress the sleeve beyond its elastic limits to form the socket 10 having generally spherical dimensions. Some elastic spring-back of the ductile sleeve will occur and dies 5 and 6 should be dimensioned so that after forming, the span between the ball and socket is substantially uniform and so that the bonding agent holds the liner to the outer dimensions of the ball.

The assembly is then taken from dies 5 and 6 and maintained at an elevated temperature in an oven, not shown, for a period of time sufficient to soften and then set the bonding agent and provide the material with a hard, permanent supporting base. No pressure is applied to the assembly during this curing operation. Socket 10 is then machined as at 11 to provide an outer cylindrical dimension of a given size and the end faces are turned to finish the same and provide the circular inner and outer lips 12 and 13 respectively, at each end of socket 10.

Figures 3, 4:
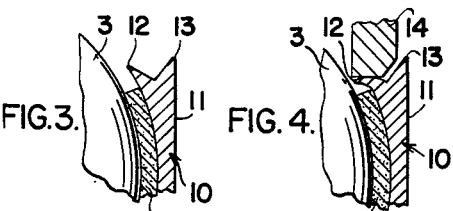
FIG. 3 is an enlarged section of a part of the bearing to show the formation of the inner and outer lips around the ends of the socket and also shows the outer dimension of the socket machined to cylindrical form.
FIG. 4 is an enlarged view similar to FIG. 3 and shows in section a part of the forming die which turns the inner lips inwardly toward the ball.
Figure 5:
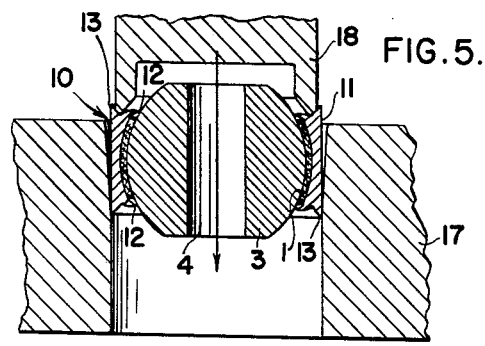
FIG. 5 shows the bearing assembled and in section with the outer dimensions of the sleeve machined as required for later mounting of the bearing and shows the sizing die in cross-section with the bearing being pushed therethrough to effect the compression and pre-setting of the liner.

The ends of socket 10 are then swaged as with the circular tool 14 shown in section in FIG. 4, to push the inner lips over the ends of liner 1 and form restricted openings between the ball and ends of the socket. Lips 12 should not contact ball 3 in the finished bearing, but in some cases, a slight contact at this stage of manufacture would be allowable in some cases and according to the relative hardness and softness of the ball and socket, respectively.

According to the invention, the assembly is then pushed through the sizing die 17 as by the arbor 18 which engages one end of socket 10. The operation radially contracts socket 10 including the hardened material forming the base for the fibrous material comprising liner 1. Only a measurable elongation of the socket is effected, however, for the reason that the socket compacts the liner to effect the "presetting" thereof. The contraction of socket 10 should be effective to produce whatever interfacial pressure is necessary to give the material of the liner a permanent set or compaction and so that further compaction under high loads is substantially eliminated.

The bearing thereafter may have an extremely tight fit. After passing through die 17, the entire liner 1 is under compressive stress between ball 3 and socket 10 and the entire socket is under tensile stress in the circumferential direction. However, the enlargement of socket 10 to relieve the tight fit is very readily effected by relieving some of the tensile stress in the socket by a rolling operation shown diagrammatically in FIG. 6. The rolling operation may be performed by applying rotating mandrels 19 to the periphery of the socket. The deformation of the periphery relieves the tensile stresses and sets up sufficient compressive stresses in the periphery to offset tensile stresses in the remaining part of the socket and allows or causes the socket to expand radially. Such expansion relieves the compression of the liner sufficiently to allow the ball 3 whatever freedom of movement is desired.

The same results may be obtained by fixing ball 3 on a rotating arbor or pin and placing a rotatable mandrel against the periphery of the socket. This procedure is similar to that shown for example in U.S. Patents 835,328 and 973,682. For the final assembly of the bearing in a housing or the rod end 20 shown in part in the drawings, the bearing unit is placed in the bore 21 of the rod end. The socket 10 should fit snugly in the rod end and is then secured by the swaging tools 22 which form the outside lips 13 of the socket to fit in the chamfers 23 at the ends of bore 21.

The completed bearing is immediately capable of withstanding high static and dynamic loads without appreciable loss of bearing fit or increase in bearing clearance. Some cold flow may occur to the extent illustrated in FIG. 8, but is generally restrained. Under abnormal loads, the extrusion of extremely small pieces of the liner material eventually occurs, and their small size indicates the restraining action of the lips 13.

Figure 10:
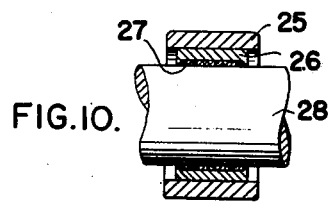
FIG. 10 shows in reduced scale, a sleeve bearing mounted in a housing shown in section and supporting a shaft shown in part and in elevation.

The present invention is not limited, however, to ball and socket-type bearings, and may be employed in the manufacture of sleeve-type friction bearings such as the bearing shown in FIG. 10 and including the housing 25 fitted with the ductile sleeve 26 provided with the liner 27 and journally supporting the shaft 28.

Figure 2:
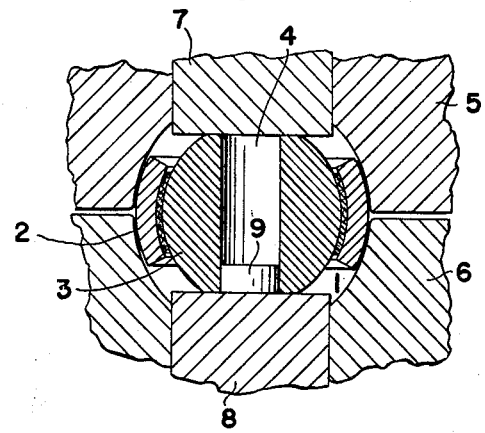
FIG. 2 is a cross-section showing the bearing with the outer socket and liner formed around the ball just after closing of the dies.

Sleeve 26 may be formed in the same manner on shaft 28 as sleeve 2 with the exception of the forming operation shown in FIG. 2. The forming operation of FIG. 5 with the mandrel 29 is also possible so that shaft 28 need not form a part of the assembly procedure.

In such procedure, the sleeve 26 is initially dimensioned to provide the desired fit between the mandrel 29 and liner 27 for the curing operation, if required. Thereafter, the assembly including sleeve 26, liner 27 and mandrel 29 is passed through the sizing die 30 by the arbor 31 to compress the sleeve on the mandrel and effect the compaction of liner 27 as previously described.

Figure 6:
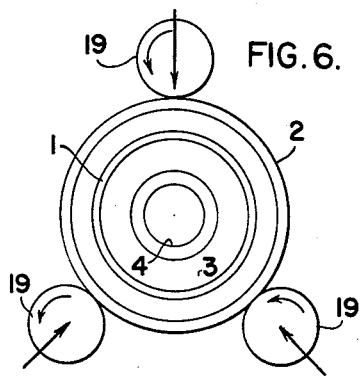
FIG. 6 is an end view of the assembled bearing which has been enlarged by the action of the rollers shown diagrammatically.
Figure 7:
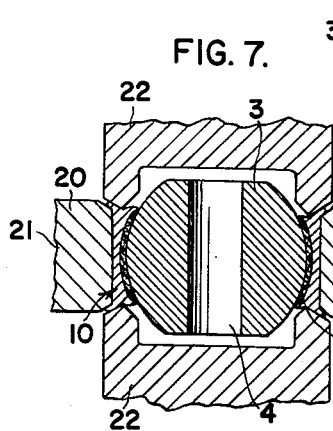
FIG. 7 is a view in section to show the outer lips at both ends of the socket being swaged to secure the bearing assembly in a housing or rod-end.
Figure 8:
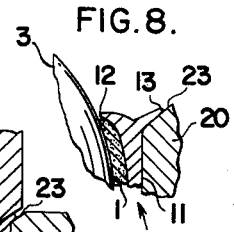
FIG. 8 is a view similar to FIG. 4 and shows the effect of loading on the liner and its restrained flow-movement toward the opening between the lips and the ball.
Figure 9:
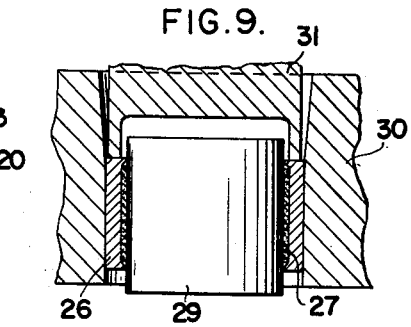
FIG. 9 is a cross-section of a plain sleeve bearing being pushed through a die with an inner mandrel shown in elevation.

After compaction, the sleeve 26 is expanded as shown in FIG. 6 or in the U.S. Letters Patent referred to and mandrel 29 is removed. The sleeve and liner may be variously installed as in the housing 25 immediately or any time thereafter. The ends of sleeve 26 may also be prepared in a manner similar to socket 10 as desired.

The invention provides an improved bearing particularly in the virtual elimination of the initial loss of bearing fit which is characteristic of certain types of lined bearings. The improvement is due to the fact that no pressure is applied to the assembly during the curing operation so that a solid, firm base is formed by the cured and set bonding agent to hold the entire face of the material against the ball or inner member or mandrel. During the subsequent contraction of the socket or outer member, the entire face of the liner is simultaneously compacted evenly and uniformly throughout to provide the maximum bearing area with the substantial elimination of voids between the fibers and between the threads comprised thereof.

Various modes of carrying out the invention are contemplated as being within the scope of the following claims particularly pointing out and distinctly claiming the subject matter which is regarded as the invention.

We claim:

1. In the manufacture of a low friction material-lined bearing which comprises an inner member, an outer race and a fibrous, wear resistant liner therebetween, the method of assembly of said bearing which includes bonding the liner to said race, and only after said bonding is completed effecting contraction of the race by pushing the same in said assembly through a sizing die to effect the presetting of the bonded liner to give the material of the liner a permanent set or compaction so that further compaction and bearing looseness under high loads in service is substantially eliminated.

2. The invention of claim 1 which further includes subsequently expanding the race and liner to provide the desired running fit of the bearing.

3. In the manufacture of a fabric-lined bearing said bearing comprising an inner member, an outer race, a wear-resistant fabric lining therebetween and a bonding agent applied to the outer race and forming a hardened base supporting said lining against said inner member, the inner side of said fabric in frictional engagement with said member mainly including wear-resistant filaments extending generally parallel with the bearing axis and the outer side of said fabric embedded in said hardened base mainly including other bondable filaments and extending circumferentially of the bearing axis, the method of assembly of said bearing which includes embedding said bondable filaments in said bonding agent, placing said member inside the race, thereafter effecting contraction of the race by pushing the assembly through a sizing die to provide by compression the permanent presetting of the unembedded wear-resistant filaments to eliminate any later permanent set and bearing looseness which may develop in service and then expanding the race and liner to provide the desired running fit of the bearing.

4. In the manufacture of a bearing including a relatively hard inner member and a relatively soft outer member, a liner therebetween of a fibrous material and a bonding agent between the liner and outer member, the steps of assembling said parts, then without the application of pressure thereto curing and setting the bonding agent to secure the liner in fixed relation to the outer member and with the liner held against the inner member over the entire bearing area of the liner, and only after said setting is completed pushing the assembled parts through a sizing die to effect contraction of the relatively soft outer member and uniformly and simultaneously and permanently compact the fibrous material of the liner in contact with the inner member, said contraction being sufficient to deform the outer member beyond its elastic limits so that after the compaction of the outer member the bearing parts are at least as tight as required for use.

5. The invention of claim 4 wherein the contraction of the outer member is followed by cold working the outer surface of the outer member to enlarge the same and provide the bearing parts with the desired running fit.

References Cited in the file of this patent

UNITED STATES PATENTS

| | | | |
|---|---|---|---|
| 1,693,748 | Fiegel | Dec. 4, | 1928 |
| 2,252,351 | Paulus | Aug. 12, | 1941 |
| 2,476,728 | Heim | July 19, | 1949 |
| 2,804,886 | White | Sept. 3, | 1957 |
| 2,835,521 | White | May 20, | 1958 |
| 2,885,248 | White | May 5, | 1959 |
| 2,904,874 | Norton | Sept. 22, | 1959 |
| 2,906,573 | Runton | Sept. 29, | 1959 |